United States Patent

Folco-Zambelli

[11] 3,938,608
[45] Feb. 17, 1976

[54] WHEELED VEHICLE ADAPTED TO TURN ON THE SPOT

[76] Inventor: Gian Matteo Folco-Zambelli, Ca Chioare 13, Vicenza, Italy

[22] Filed: Jan. 18, 1974

[21] Appl. No.: 434,571

[30] Foreign Application Priority Data
Jan. 23, 1973 Italy ............................. 19491/73
Jan. 23, 1973 Italy ............................. 20496/73

[52] U.S. Cl. ............... 180/21; 180/65 R; 280/47.11
[51] Int. Cl.² ..................................... B62D 61/00
[58] Field of Search ................ 180/21, 2, 65 R; 280/47.11, 205

[56] References Cited
UNITED STATES PATENTS

| | | | |
|---|---|---|---|
| 2,468,801 | 5/1949 | Beall | 180/DIG. 3 |
| 2,950,121 | 8/1960 | Fisher | 280/47.11 |
| 3,404,746 | 10/1968 | Slay | 180/23 |
| 3,492,017 | 1/1970 | Czichos | 180/2 X |
| 3,690,697 | 9/1972 | Bohanski | 280/247 |
| 3,700,058 | 10/1972 | Kuwahara | 180/21 |
| 3,800,898 | 4/1974 | Griffin | 180/34 |

*Primary Examiner*—Kenneth H. Betts
*Attorney, Agent, or Firm*—Karl F. Ross; Herbert Dubno

[57] ABSTRACT

A wheeled self-propelled vehicle has a load-carrying body, such as a platform or a driver's seat, which is horizontally rotatable on a spider-leg frame having a caster or support wheel swivelably mounted at the free end of each leg. The body is rigid with a vertical shaft carrying at its lower end a mounting for a guide wheel driven by a motor. Rotation of the body with reference to the frame imparts a desired orientation to the guide wheel which touches the ground, under load, with sufficient force to exert traction for advancing the vehicle. The body rests on the frame by way of one or more shock absorbers or springs which may be adjustable to different loads. The support wheels and the guide wheel may be positively interlinked, through a chain or toothed-belt drive, to rotate in unison about their respective swivel axes.

12 Claims, 6 Drawing Figures

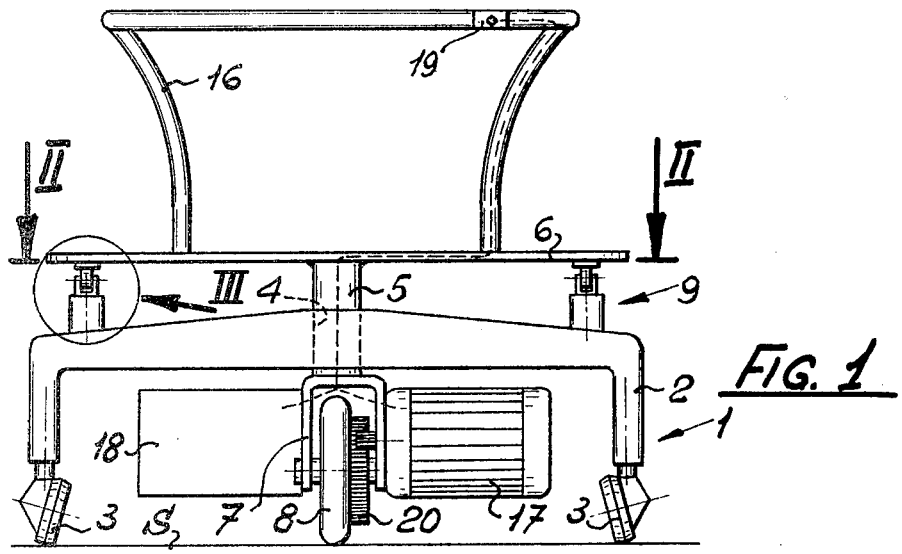
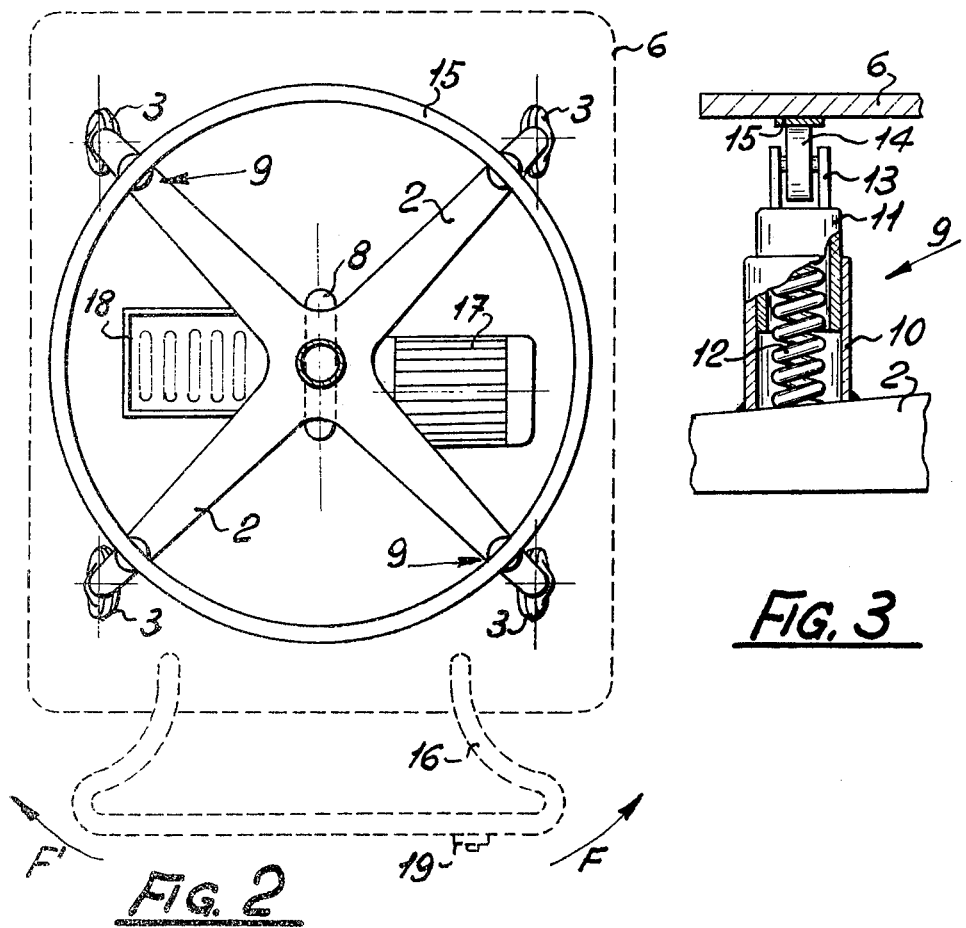

WHEELED VEHICLE ADAPTED TO TURN ON THE SPOT

FIELD OF THE INVENTION

My present invention relates to a wheeled vehicle designed to perform tight turns about a vertical axis.

BACKGROUND OF THE INVENTION

Vehicles capable of turning on the spot may find effective application in all those spheres in which maximum mobility and orientation are required with minimum effort and bulk such as, for example, in the case of self-propelling wheel chairs, dollies for television and cinematographic power supplies, toys, warehouse trucks, go-carts, luggage carts, hospital beds and the like, as well as remote-controlled vehicles for the most varied uses.

OBJECT OF THE INVENTION

The object of my invention is, therefore, to provide a vehicle capable of changing direction with a zero turning radius.

SUMMARY OF THE INVENTION

This object is realized, in accordance with my present invention, by the provision of a wheeled vehicle base and a load-carrying body rotatable relatively thereto about a vertical axis, this body having a central shaft journaled in the base which preferably is in the form of a spider-leg frame carrying three or more swivelable support wheels angularly spaced about that axis. A guide wheel, mounted on the lower end of the shaft, rotates in a vertical plane which has an invariable orientation with reference to the body so that any turning of the body relative to the base entrains the guide wheel into a desired position of advance. Since the swivelable support wheels normally are aligned with one another, in the direction of previous displacement, they effectively resist rotation of the base about its axis while the centrally positioned guide wheel forms a convenient fulcrum for such rotation on the part of the body.

In a self-propelled vehicle of this nature, a drive motor is coupled with one or more of the wheels, advantageously with the central guide wheel which thereby operates also as a traction wheel. The body should then be supported on the base through one or more cushioning devices, such as simple springs or shock absorbers of mechanical or hydropneumatic character, so calibrated or adjustable as to allow the guide wheel to contact the ground (at least under load) with sufficient force to exert the necessary traction for advancing the base and with it the entire vehicle. Though the swivel-mounted support wheels will normally align themselves automatically with the traction and guide wheel as soon as the vehicle begins to move forward or possibly backward, I may interconnect all these wheels by a linkage positively maintaining them parallel to one another. This enforced parallelism rules out any possible wheel position facilitating rotation of the base.

BRIEF DESCRIPTION OF THE DRAWING

The above and other features of my invention will now be described in detail with reference to the accompanying drawing in which:

FIG. 1 is a front-elevational view of a vehicle embodying my invention;

FIG. 2 is a cross-section taken on the line II — II of FIG. 1, showing in full lines a wheeled frame and in phantom lines an overlying loading platform and associated handle;

FIG. 3 is an enlarged elevational view (with parts broken away) of a detail in the area III of FIG. 1;

SPECIFIC DESCRIPTION

Figure 4:
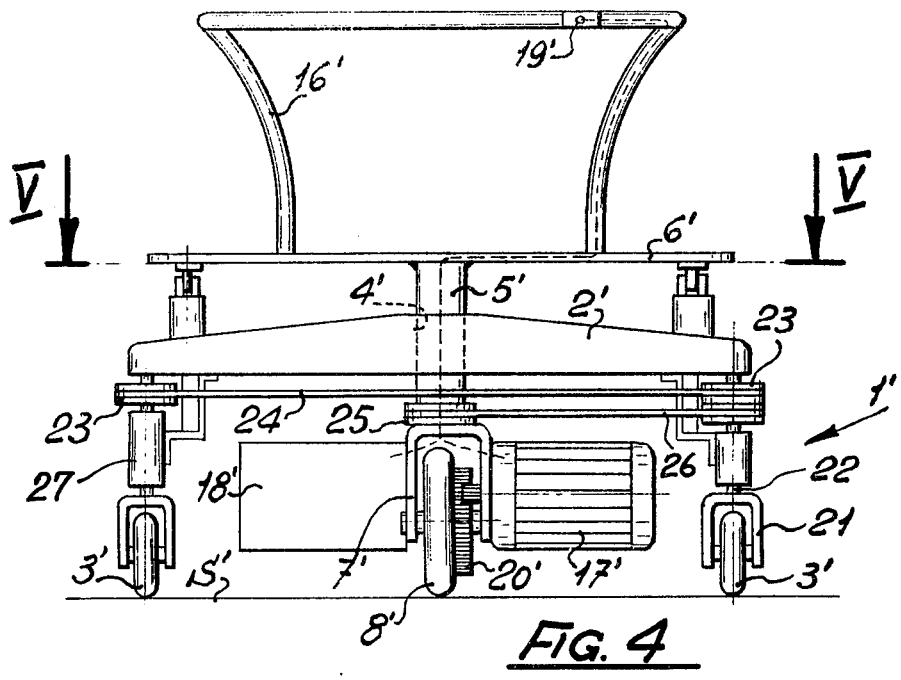
FIG. 4 is a front view similar to FIG. 1, illustrating a modification.

In FIGS. 1–3 I have shown a hand truck comprising a base frame 1 constituted by four radially extending spider legs 2 in the form of a cross whose extremities carry swivelable caster wheels 3. A circular bore 4 provided at the junction of legs 2 is freely traversed by a central vertical shaft 5 whose upper end is securely fixed to a loading platform 6 and whose lower end carries a forked member 7 in which a guide and traction wheel 8 is mounted. The outer end of each leg 2 is braced against platform 6 by a telescopic shock absorber 9 including a fixed lower cylinder 10 in which a displaceable upper cylinder 11 is free to slide, a helicoidal compression spring 12 being interposed between the two cylinders. The top of the displaceable cylinder 11 supports a fork 13 which carries a small idler roller 14 riding on a circular low-friction track 15 on the underside of the loading platform 6.

The springs 12 are so dimensioned as to ensure, when the truck is loaded, sufficient frictional contact of the traction wheel 8 with the ground S and to absorb part of the weight of the load disposed on the platform 6 so as to distribute this weight equally among the casters 3 and the traction wheel 8; this is necessary in order to facilitate the swiveling of the casters 3 and to ensure uniform contact of all the wheels with the ground surface.

In some instances the telescopic shock absorbers 9 could be replaced by a single spring (as illustrated at 109 in FIG. 6) coiled around shaft 5 between the lower face of loading platform 6 and the top of base frame 1; this solution, however, is suitable only if the load is distributed so uniformly on the platform 6 or is so concentrated that its center of gravity substantially coincides with the axis of shaft 5.

Platform 6 is provided with a handle 16 enabling it to be swung horizontally, in the direction of arrows F, F', together with the traction wheel 8 whereupon the truck can be advanced in a direction determined by the orientation of the wheel 8. This rotation of platform 6 is extremely simple and requires little effort, regardless of load, since it takes place about a fulcrum which is represented by the point of contact of the wheel 8 with the ground S.

In the embodiment just described, the truck is of the self-propelling type provided with an electric motor 17 supplied from a battery 18 and controlled by a pushbutton 19 on the handle 16. The motor 17 and the battery 18 are mounted on opposite sides of the fork 7 and transmission of the torque from the motor 17 to the guide wheel 8 takes place via a set of reducing gears 20.

The swiveling wheels 3 may be of any suitable diameter, may carry tires if desired, and may be provided with conventional suspensions, according to the use and dimensions of the truck.

Figure 5:
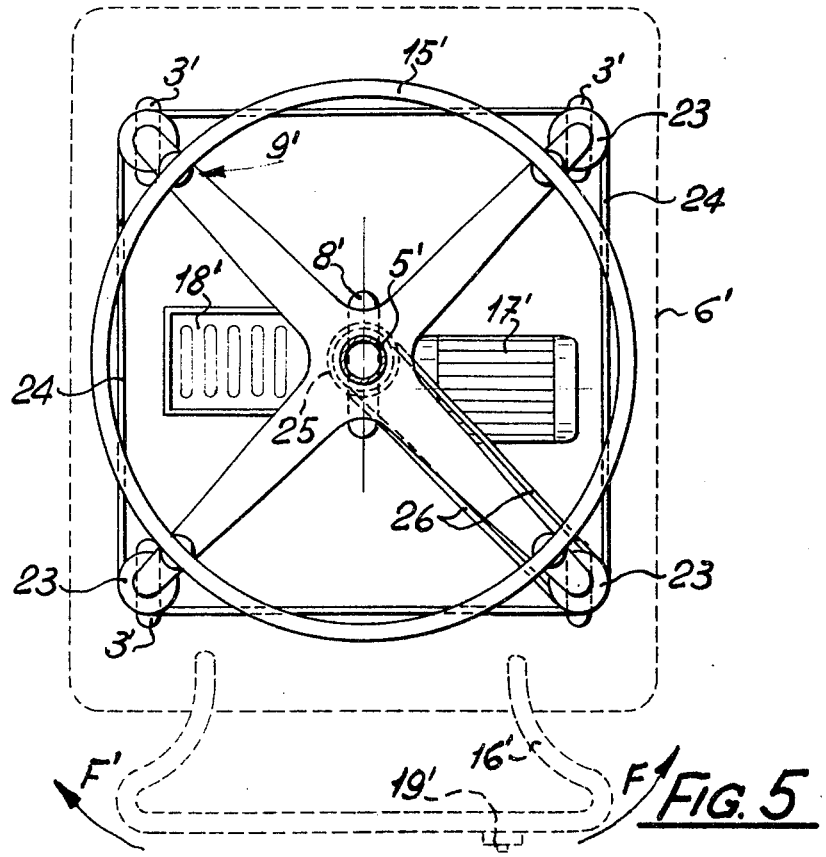
FIG. 5 is a cross-sectional view similar to FIG. 2, taken on the line V — V of FIG. 4.

The embodiment illustrated in FIGS. 4 and 5, in which elements corresponding to those of FIGS. 1–3 have been given the same reference numerals supplemented by a prime mark, differs from the foregoing one mainly by the use of casters or support wheels 3' of the harnessed type in lieu of the simple swivel casters 3, the remaining parts being identical with those illustrated in FIGS. 1–3.

The casters 3' are mounted on forks 21 whose stems 22, which are journaled in bearings 27 secured to legs 2', carry toothed pulleys or sprockets 23 interlinked by a continuous toothed belt 24. Keyed onto the shaft 5', below the frame 1', is another toothed pulley 25 linked with one of the sprockets 23 by a toothed belt 26, the pulleys 23, 25 being of the same diameter to ensure synchronous swiveling thereof. Thus, rotation of the shaft 5' causes a corresponding rotation of the pulley 25 and hence an identical swing of the wheels 3'.

In cases where the operator rides on the platform 6 or 6' (e.g. if the truck is used to carry a mobile power supply for television or cinematographic equipment), the orientation of the guide and traction wheel 8 or 8' may be effected by means of a reversible ancillary electric motor (not shown) connected to the base frame 1 or 1' and acting via a chain or a toothed belt on a sprocket or pulley keyed onto the shaft 5 or 5'. Alternatively, this ancillary motor could be mounted on the platform 6 or 6' so as to drive base frame 1 or 1' through a pinion on the motor shaft and a circular rack on the frame.

The coil springs 12 of the mechanical shock absorbers 9 or 9' could be replaced by fluid-actuated cushioning means such as hydropneumatic jacks, the truck being then provided with a conventional control circuit for keeping the hydraulic pressure in the various jacks uniformly distributed.

Figure 6:
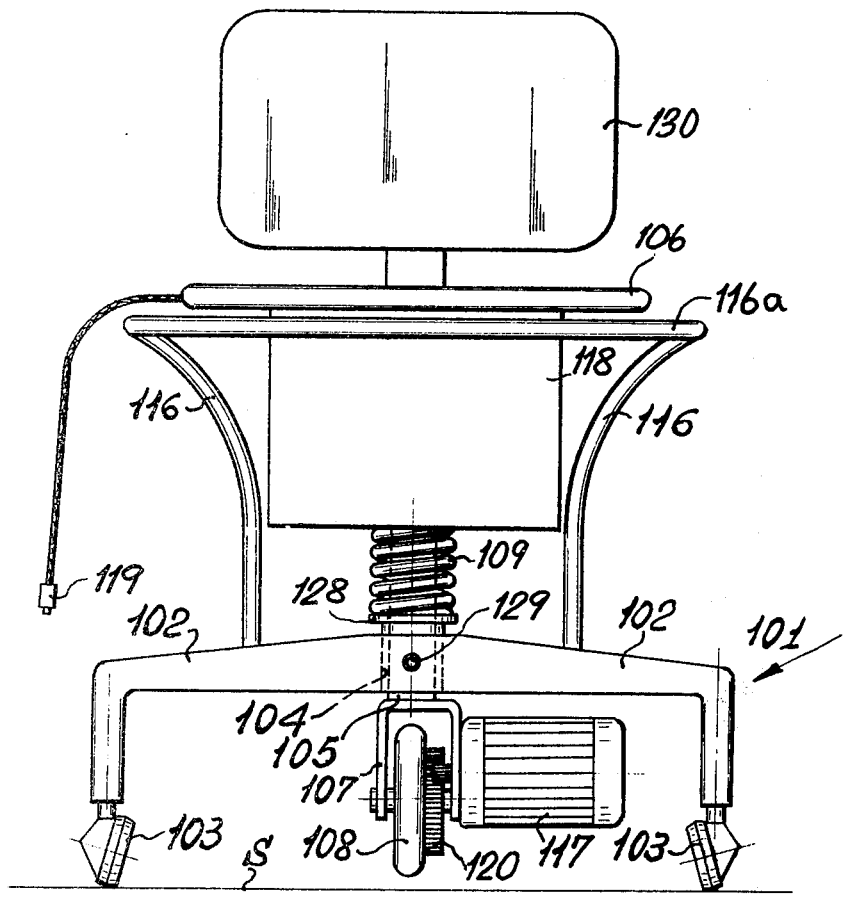
FIG. 6 shows a front view of another vehicle embodying the present invention.

FIG. 6 shows a mobile structure according to my present invention designed to be used as a self-propelled chair. In this embodiment, elements corresponding to those of FIGS. 1–3 have been designated by the same reference numerals increased by 100.

The upper end of shaft 105 is rigidly secured to the base of a battery case 118 which carries a driver's seat 106 with an associated back rest 130. Battery case 118 bears upon a helicoidal compression spring 109 wound around the shaft 105 and resting on an externally threaded bushing 128 screwed into the threaded center bore 104.

Spokes 116 rise from the legs 102 of the frame 101, to support a handwheel 116a which surrounds the seat 106 but lies on a level slightly lower than that of the seat. Bushing 128 can be adjusted to vary the degree of compression of the spring 109. This spring must be so calibrated as to ensure an equal distribution of weight between the traction and guide wheel 108 and the support wheels 103, as discussed above, when the driver's seat 106 is occupied. Motor 117 is energized from the battery in case 118 by wires which may pass through the hollow shaft 105.

A setscrew 129 enables the bushing 128 to be locked in a desired position for maintaining the stress of spring 109. With the seat 106 vacated, as shown in FIG. 6, the wheel 108 may be slightly raised from the ground S, the intervening distance being reduced to zero by a yielding of the spring 109 under the weight of the operator taking this seat. The operator then grasps the handwheel 116a and, by rotating the seat 106 relatively to the frame 101, selects an orientation for the wheel 108 acting as the fulcrum of the assembly. By actuating the pushbutton 119, the operator starts the motor 117 and then steers the vehicle in the chosen direction, the swiveling casters 103 aligning themselves automatically with the wheel 108 upon incipient forward (or backward) movement.

Naturally, harnessed support wheels of the type shown at 3' in FIGS. 4 and 5 may be substituted for the simple casters 103 of FIG. 6 and may be interlinked as described above for synchronous rotation.

I claim:
1. A vehicle comprising:
   a load-carrying body forming a driver's seat;
   a base provided with at least three swivelable support wheels angularly spaced about a vertical axis, said body having a shaft in line with said axis journaled in said base;
   a central guide wheel mounted on the lower end of said shaft for rotation in a vertical plane having an invariable orientation with reference to said body;
   steering means for rotating said body relatively to said base about said axis;
   drive means coupled with said guide wheel for propelling said base over said surface in a direction determined by the orientation of said guide wheel, said drive means including a battery mounted on said body beneath said driver's seat and a motor powered by said battery; and
   cushioning means in said base supporting said body while letting said guide wheel come to rest on said surface with sufficient force to exert traction at least under load.
2. A vehicle as defined in claim 1 wherein said cushioning means comprises a central spring coiled about said shaft, said battery having a case supported by said spring.
3. A vehicle as defined in claim 1, further comprising a linkage positively interconnecting all said wheels for swiveling parallel to one another.
4. A vehicle comprising:
   a load-carrying body;
   a base provided with at least three swivelable support wheels angularly spaced about a vertical axis, said body having a shaft in line with said axis journaled in said base;
   a central guide wheel mounted on the lower end of said shaft for rotation in a vertical plane having an invariable orientation with reference to said body;
   steering means for rotating said body relatively to said base about said axis;
   drive means coupled with said drive wheel for propelling said base over said surface in a direction determined by the orientation of said guide wheel;
   cushioning means in said base supporting said body while letting said guide wheel come to rest on said surface with sufficient force to exert traction at least under load; and
   a linkage positively interconnecting all said wheels for swiveling parallel to one another.
5. A vehicle as defined in claim 4 wherein said wheels are provided with rotatable harnesses, said linkage comprising toothed pulleys rigid with said harnesses and toothed belt means engaging said pulleys.
6. A vehicle as defined in claim 4 wherein said shaft is provided with a bifurcate mounting for said guide wheel, said drive means comprising a motor carried on said mounting.

7. A vehicle as defined in claim 4, further comprising adjusting means for varying the upward force exerted by said cushioning means upon said body.

8. A vehicle as defined in claim 7 wherein said cushioning means including a coil spring surrounding said shaft, said adjusting means comprises a threaded bushing screwed into said base and traversed by said shaft, said spring bearing upon said bushing.

9. A vehicle comprising:
- a load-carrying body;
- a base provided with at least three swivelable support wheels angularly spaced about a vertical axis, said body having a shaft in line with said axis journaled in said base;
- a central guide wheel mounted on the lower end of said shaft for rotation in a vertical plane having an invariable orientation with reference to said body;
- steering means for rotating said body relatively to said base about said axis;
- drive means coupled with said guide wheel for propelling said base over said surface in a direction determined by the orientation of said guide wheel;
- a coil spring on said base surrounding said shaft and supporting said body while letting said guide wheel come to rest on said surface with sufficient force to exert traction at least under load; and
- adjusting means for varying the upward force exerted by said coil spring upon said body, said adjusting means including a threaded bushing screwed into said base and traversed by said shaft, said spring bearing upon said bushing.

10. A vehicle as defined in claim 9 wherein said drive means comprises a motor and a battery for energizing same.

11. A vehicle as defined in claim 10 wherein said body forms a driver's seat, said battery being mounted on said body beneath said driver's seat.

12. A vehicle as defined in claim 11 wherein said steering means comprises a wheel rigid with said base surrounding said body on a level below that of said driver's seat.

* * * * *